C. V. HENDRICKSON, Jr. & J. F. MERGENDELLER.
FIXTURE SUPPORT.
APPLICATION FILED APR. 9, 1915. RENEWED NOV. 7, 1917.
1,249,955.  Patented Dec. 11, 1917.
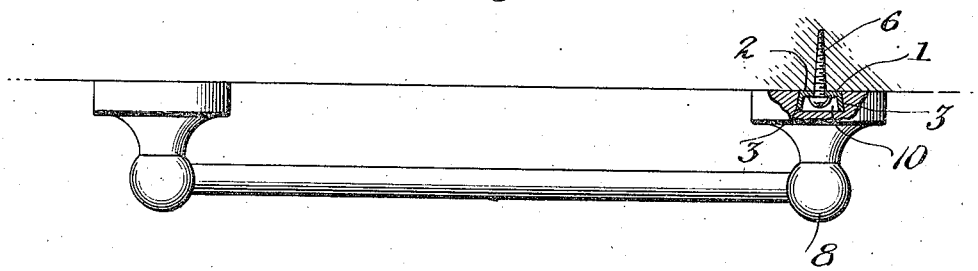
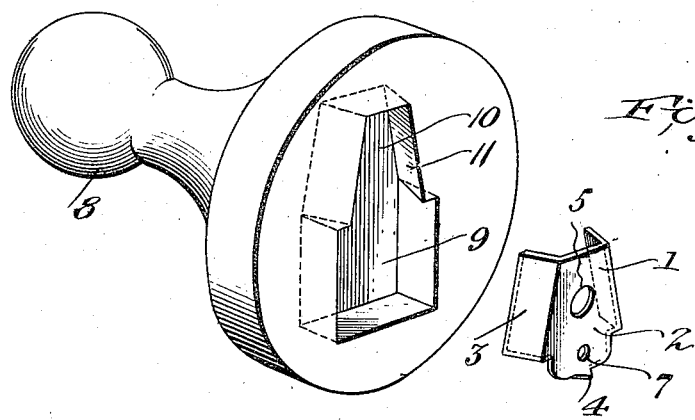
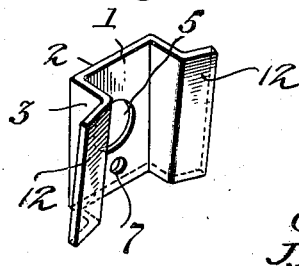
Witnesses
A. V. Doyle.
M. E. Laughlin.
Inventors
C. V. Hendrickson Jr
J. F. Mergendeller
By Victor J. Evans
Attorney

UNITED STATES PATENT OFFICE.

CLARKSON V. HENDRICKSON, JR., AND JOHN F. MERGENDELLER, OF BROOKLYN, NEW YORK.

FIXTURE-SUPPORT.

1,249,955.  Specification of Letters Patent.  Patented Dec. 11, 1917.

Application filed April 9, 1915, Serial No. 20,282. Renewed November 7, 1917. Serial No. 200,845.

*To all whom it may concern:*

Be it known that we, CLARKSON V. HENDRICKSON, Jr., and JOHN F. MERGENDELLER, citizens of the United States, residing at Brooklyn, in the county of Kings and State of New York, have invented new and useful Improvements in Fixture - Supports, of which the following is a specification.

This invention relates to supports especially adapted to be used for applying fixtures to a wall and it consists in the novel features hereinafter described and claimed.

An object of the invention is to provide a simple and durable device adapted to be used for the purpose stated and which may be used for connecting brackets, racks or other similar articles with a supporting wall.

The device includes a clip of especial design adapted to be applied to the wall or other supporting object the said clip being adapted to engage in a socket provided at the back of the fixture in a manner whereby the fixture may be readily disconnected from the wall when desired.

In the accompanying drawing:—

Figure 1 is a top plan view of a bracket applied to the support with parts broken away and parts in section.

Fig. 2 is a perspective view of a bracket and one form of the supporting clip therefor.

Fig. 3 is a perspective view of a modified form of supporting clip.

The support comprises a clip 1 preferably formed from sheet metal possessing more or less resiliency.

In the form of clip as shown in Figs. 1 and 2 of the drawing the same consists of an intermediate portion 2 provided at its opposite sides with flanges 3. The said flanges converge with relation to each other and are inclined with relation to the plane in which the intermediate portion 2 lies. The intermediate portion 2 of the clip is provided at one end with an outstanding prong 4 which is adapted to be embedded in a wall or other object upon which the device is mounted. The intermediate portion 2 of the clip is provided with an opening 5 through which a securing screw 6 or other suitable securing device may be passed for attaching the clip 1 to the wall or supporting object. The intermediate portion 2 of the clip may also be provided with an opening 7 at a point below the opening 5 which may receive a brad, nail or other similar securing means not shown.

When the clip 1 is applied to a wall the screw 6 is passed through the opening 5 and driven into the wall as best indicated in Fig. 1 of the drawing and when the said screw is tight the prong 4 is forced into the wall thus preventing the clip 1 from turning about the screw 6. If it is desired to positively prevent the possibility of the clip turning upon the supporting screw a brad or nail is passed through the opening 7 and driven into the wall.

The fixture 8 is provided at its back with a socket 9 in which the clip 1 may be received when the fixture 8 is placed over the same. The socket 9 is provided at its upper side with an extension 10 having converging and inclined side walls 11 which snugly receive the flanges 3 between them when the said fixture is moved in a downward direction parallel with the plane of the intermediate portion 2 of the clip 1. When so applied the walls 11 bear directly against the outer surfaces of the flanges 3 and the fixture 8 is held against movement in an outward direction with relation to the wall.

When it is desired to remove the fixture 8 from the wall it is passed in an upward direction with relation to the clip 1 whereby the flanges 3 of the clip 1 move down into the socket 9. The fixture 8, may then be moved in an outward direction with relation to the wall and freely disconnected or detached from the clip 1.

In the form of clip as shown in Fig. 3 of the drawing the same general structural arrangement is followed as that shown and described in connection with the form of clip shown in Fig. 2 with the exception that additional flanges 12 are provided at the outer edges of the flanges 3. In this form of the device the extension of the socket 9 in the fixture 8 which is used in conjunction with the clip is provided with overhanging walls adapted to engage behind the flanges 12 when the fixture is moved down along the clip and consequently the said flanges materially assist the flanges 3 in supporting the fixture upon the clip.

From the above description taken in conjunction with the accompanying drawing it will be seen that a supporting means for racks, brackets, cabinets or similar devices is provided and that the said supporting means is of simple and durable structure and that the object supported upon the clip may be easily and quickly detached and removed therefrom.

Having described the invention what is claimed is:—

In combination, a metallic clip consisting of a flat base portion formed with converging edges and with a pair of wings formed integrally upon said converging edges longitudinally thereof, said wings converging toward said base portion throughout their length, a bracket consisting of a body of material thickness, said body being formed transversely with a socket shaped so as to provide edges against which the base portion and wings of said clip may contact with the base portion in contact with the inner wall of said socket, said socket being formed in a plane with said clip receiving portion with a substantially rectangular socket having opposing edges which extend laterally of the sides of the first socket to enlarge the space immediately in advance of the entrance to said first socket, whereby to permit said clip to loosely enter the rectangular socket and be frictionally guided into the first named socket.

In testimony whereof we affix our signatures in presence of two witnesses.

CLARKSON V. HENDRICKSON, JR.
JOHN F. MERGENDELLER.

Witnesses:
SAML. GREENBAUM,
GEO. F. BYRNE.